July 15, 1947.　　　N. LANDESBERG　　　2,424,039
REGULATION OF THE FLOW OF WATER THROUGH HYDRAULIC TURBINES
Filed May 10, 1944
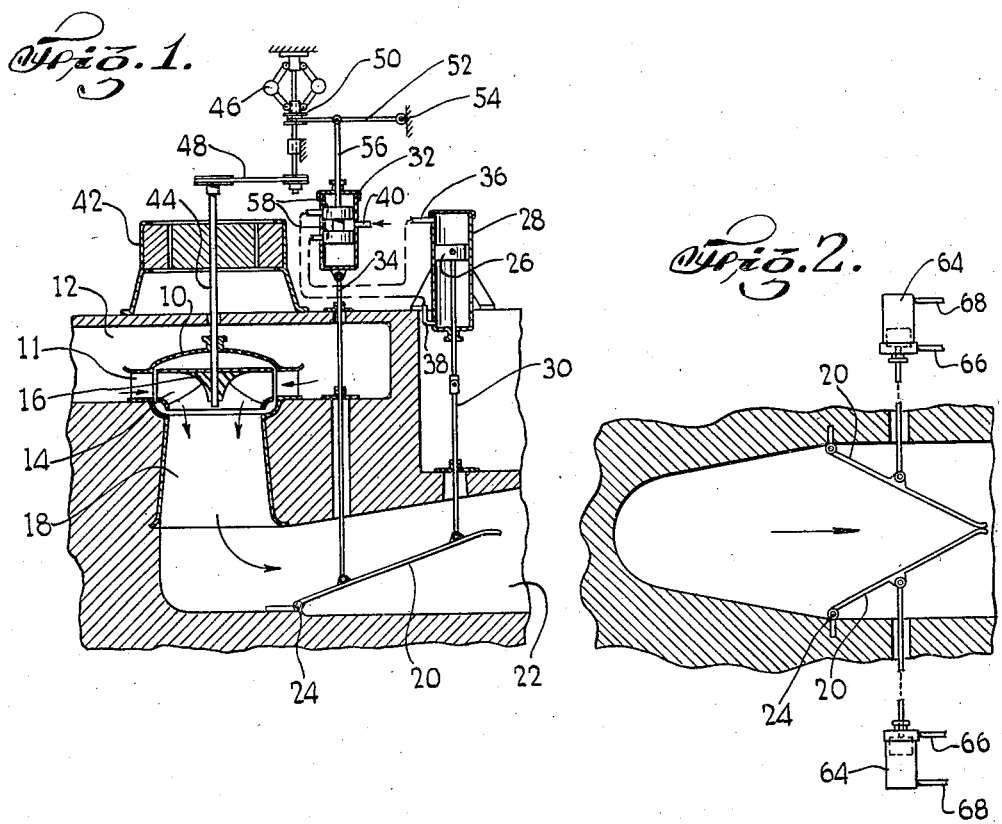
INVENTOR.
NATHAN LANDESBERG
ATTORNEYS Patented July 15, 1947

2,424,039

UNITED STATES PATENT OFFICE 2,424,039

REGULATION OF THE FLOW OF WATER THROUGH HYDRAULIC TURBINES

Nathan Landesberg, New York, N. Y., assignor to Hydropress, Incorporated, New York, N. Y., a corporation of Delaware Application May 10, 1944, Serial No. 534,892

3 Claims. (Cl. 253—143)

1

This invention relates to improved hydraulic turbines of the reaction type and particularly to such turbines having the quantity of water flowing therethrough controlled in response to the power demands made upon the turbines.

Heretofore, it has been customary to control the quantity of water flowing through reaction turbines by varying the cross sectional area of the passageway between the guide vanes which direct the water onto the vanes or blades of the rotor. This type of regulation, however, has introduced a number of problems, especially problems of cavitation and turbulence and inefficient utilization of the hydraulic energy.

In the early stages of the regulation of the guide vanes to control the size of the passage between the vanes, the speed of the water is merely increased, and the quantity of water is diminished mainly by increased friction or turbulence due to the fact that the flow of water is not materially lessened until the pressure in the restricted orifice has reached its minimum. When the minimum pressure has been reached, the regulation of the passageway between the guide vanes to control the quantity of water passing therethrough to the turbine becomes more effective, but problems of cavitation and turbulence are introduced through the presence of low pressure areas, excessively high velocities, and partially filled turbine chambers and draft tubes. Additionally, in the regulation of the flow of water through the turbine by an adjustment of the position of the guide vanes, it is not possible to design their curvatures so as to be well adapted to all velocities and degrees of constriction and as a result shock losses are encountered in the rotor due to improper impact angles between the water and the rotor blades.

It is a purpose of this invention to provide an improved reaction turbine wherein the quantity of water flowing therethrough may be advantageously controlled in response to the power demands made upon the turbine.

Yet, another object of the invention is to provide a simple, efficient and automatic means for controlling the flow of water through a reaction turbine in response to power demands.

A special object of the invention is to provide a reaction turbine in which its thruput of water can be regulated without the introduction of problems of cavitation and turbulence, which substantially limit the advantages of controlling the water through the turbine.

Another object of the invention is to provide a method and means for controlling the flow of

2 water through a reaction turbine, in which the control means is located on the outlet side of the turbine, whereby changes in vane angles and angles of water impact on the inlet side may be entirely avoided.

Other advantages, features and objects of my invention will be apparent from the more detailed description which follows.

I have found that an improved hydraulic turbine of the reaction type suited to the purpose of this invention can be made by placing a closure means in the outlet or draft tube suitable for gradually changing the size of its passageway. Draft tubes are normally designed both as to shape and length, such that the water head and the kinetic energy of the water passing from the turbine into the draft tube is utilized to an optimum degree. In a special feature of the present invention the closure means for gradually regulating the size of the passageway or the cross sectional area of the draft tube is located near the end of the draft tube in order to obtain the optimum advantages of the draft tube, to lessen the strain on the closure means and to reduce the problems of cavitation and turbulence. When it is stated hereinafter that the means for gradually regulating the size of the passageway of the draft tube is placed near the end of the draft tube, it will be understood that the position of the regulating device will be either near the actual end of the draft tube or at the position in the draft tube wherein the optimum advantages of the draft tube are obtained.

Referring to the drawings:

Figure 1 is a sectional view, in elevation, of a reaction turbine having an elbow type draft tube;

Figure 2 is a horizontal plan view of a modification of the draft tube of Figure 1.

Referring to the drawings in detail, and particularly to Figure 1, 10 is a diagrammatic view of a reaction turbine having water flowing into it through guide vanes 11 from a source of supply 12. The water flows onto the vanes or blades 14 of the rotor 16, and thence through the draft tube 18 past the closure plate 20 into the tail race or tail waters 22.

Closure plate 20 is hinged at 24 and is connected to piston 26 of fixed cylinder 28 through rod 30 and to the regulating valve 32 through rod 34. The upper and lower portions of the fixed cylinder 28 are connected to the regulating valve 32 through flexible tubing 36 and 38. Regulating valve 32 is also supplied with a fluid under pressure through tube 40.

Rotor 16 is keyed to generator 42 through a shaft 44 which in turn drives a governor 46 through a drive shaft generally designated at 48. Governor 46 is provided with a sliding sleeve 50 which is keyed to a lever 52 fulcrumed at 54. The lever 52 is connected through a rod 56 to dual pistons 58 of the regulating valve 32.

In the modification of Figure 1 shown in Figure 2, the draft tube 18 is provided with two closure plates 20 which may be opened or closed through the application of pressure to cylinders 64 through tubes 66 and 68.

In Figures 1 and 2, showing an elbow type of draft tube, the circular section in the vertical part of the draft tube 18 gradually and smoothly changes to a rectangular section in the horizontal part. The elongated closure plates 20 are designed to fit snugly into this retangular section and to extend completely across the rectangular portion permitting gradual and complete opening or closing of the passageway without creating turbulence in the water with a resulting power loss. The snug fit of plates 20 likewise precludes the flow of water and air from the tail race back into the draft tube which would also create turbulence and whirls in the water and would result in considerable power loss.

Reference to the various figures shows that my hydraulic turbines are provided with closure means near the end of the draft tubes for gradually and smoothly varying the size of the passageway and, if necessary, completely closing the passageway through the draft tube. Varying gradually means here that the cross sectional area of the draft tube changes smoothly in the direction of the end of the draft tube as the closure means assume various positions within the draft tube. The use of a closing gate or other similar device to regulate the flow of water through the turbine has been found to cause excessive turbulence in the draft tube and to result in substantial power losses. Furthermore, by locating the means for controlling the flow of water through the turbine near the end of the draft tube the control is exerted at the point where the water has its minimum velocity and the necessary restriction of the passageway has a minimum effect upon the turbulence of the water and creates substantially no problems of cavitation.

As compared to the use of guide vanes for regulating the flow of water through the turbines, which vanes should be designed to cause the water to impact the runner blades at the most effective angles, the use of closure means in the draft tube permits designing of these closure devices to reduce turbulence and cavitation to a minimum.

Additionally, in my apparatus, since the guide vanes do not have to serve the dual function of controlling the flow of water through the turbine and at the same time determining the angle of impact of the water on the runner vanes, they may be designed to most effectively direct the flow of water upon the runner vanes and thereby reduce turbine shock and the resulting vibrations to a minimum. I have found further that using closure means in the draft tube for regulating the flow of water through a turbine permits the use of a much smaller number of guide vanes and even, in many instances, permits the use of fixed guide vanes which greatly add to the strength and stability of the turbine. Thus my method of controlling the flow of water through hydraulic turbines makes possible much more effective designing of turbines than heretofore.

Various devices may be used to regulate the position of the closure means gradually controlling the size of the passageway in the draft tube. The operation of the apparatus may be readily understood by a reference to Figure 1 showing a preferred and automatic means for controlling the position of the closure means gradually and smoothly regulating the size of the passageway through the draft tube. In the apparatus, as shown, the turbine is operating at normal load for the thruput of water, and the openings in the tubes 36 and 38 leading from the regulating valve 32 to cylinder 28 are closed by the dual valve 58. If the power demands upon the generator 42 are increased the speed of the turbine 10 will decrease and the speed of the governor 40 will lessen causing the collar 50 to assume a lower position on the rod 48. This movement will cause the lever 52 to move downward about its fulcrum 54 and force the dual pistons 58 downward towards the bottom of the regulating valve 32. In this new position the fluid under pressure in tube 40 will be placed in contact with flexible tube 36 through regulating valve 32 and will pass to the upper portion of the cylinder 28. This pressure will force the piston 26 downward and gradually increase the size of the passageway between the walls of the draft tube 18 and the plate 20. This movement will tend to move the valve 32 downward and tend to cause the lower of the dual pistons 58 to close the entrance to tube 36 and the upper piston to close the entrance to tube 38. At the same time, the increased flow of water through the turbine will cause the speed of the turbine to increase and the governor 46 will tend to assume a normal position thereby raising the dual pistons 58 in the regulating valve 32. The motion of the cylinder 32 downward, due to the downward motion of the plate 20, and the upward motion of the dual valves 58, due to the governor 46 assuming its normal position, are designed to coordinate in such a manner that the tubes 36 and 38 are out of connection with the fluid under pressure when the system is supplied with water in sufficient quantity to meet the power demands.

Again referring to Figure 1, it will be seen that a decrease in load will cause the governor 46 to move upward and thereby raise the dual valves 58 and place the fluid under pressure in tube 40 in contact with tube 38. The pressure placed under the bottom of valve 26 will cause the valve to raise and gradually close the space between the plate 20 and the draft tube 18 thereby cutting down the flow of water through the turbine. From this point on the apparatus works in essentially the same manner as previously described.

I have shown and described illustrative embodiments of my invention but it will be understood that the other embodiments and variations are possible without departing from the spirit of the invention. Therefore, my invention is not limited to the precise details of construction set forth but encompasses modifications, variations, and adaptations within the scope of the appended claims.

I claim:

1. A hydraulic turbine having a body of water flowing through the turbine, a rotor and vanes on the rotor impelled by the flow of water past the turbine, and means for controlling the quantity of water flowing through the turbine comprising an elbow-type draft tube discharging water from the turbine into the tail race from a rectangular horizontal section of said draft tube and a water-guiding substantially rigid valve attached at one end to a side of the draft tube in the horizontal section thereof and swingable about an axis in said draft tube side between closed and open condition to vary gradually the size of the draft tube and thereby the quantity of water flowing through the turbine from substantially no flow to full flow.

2. A hydraulic turbine having a body of water flowing through the turbine, a rotor and vanes on the rotor impelled by the flow of water past the turbine, and means for controlling the quantity of water flowing through the turbine comprising an elbow-type draft tube discharging water from the turbine into the tail race from a rectangular horizontal section of said draft tube, a water-guiding substantially rigid valve attached at one end to a side of the draft tube in the horizontal section thereof, and control means connected to the valve operable to swing said valve in response to load on the turbine about an axis in said draft tube side between closed and open condition to vary gradually the size of the draft tube and thereby the quantity of water flowing through the turbine from substantially no flow to full flow.

3. A hydraulic turbine having a body of water flowing through the turbine, a rotor and vanes on the rotor impelled by the flow of water past the turbine, and means to control the quantity of water flowing through the turbine comprising an elbow-type draft tube discharging water from the turbine into the tail race of a rectangular horizontal section of said draft tube, and a water-guiding substantially rigid valve swingable about an axis in said draft tube side in sealed relationship to said side in the horizontal section of the draft tube and in sealed relationship to the two sides of said draft tube adjacent to the side in which said axis is located, to vary gradually the size of the draft tube between closed and open positions and thereby the flow of water through the turbine from substantially no flow to full flow.

NATHAN LANDESBERG.

REFERENCES CITED

The following references are of record in the file of this patent:

UNITED STATES PATENTS

| Number | Name | Date |
| --- | --- | --- |
| 40,986 | Whalen | Dec. 15, 1863 |
| 534,623 | Replogle | Feb. 19, 1895 |
| 1,950,774 | Biggs | Mar. 13, 1934 |
| 1,978,809 | Moody | Oct. 30, 1934 |
| 2,336,450 | Voorhess | Dec. 7, 1943 |
| 1,369,863 | White | Mar. 1, 1921 |
| 1,671,046 | Pfau | May 22, 1928 |
| 2,246,472 | Sharp | June 17, 1941 |
| 2,366,732 | Kalix | Jan. 9, 1945 |
| 899,275 | Weinman | Sept. 22, 1908 |
| 2,375,432 | Miller et al. | May 8, 1945 |
| 2,400,044 | Hermanson | May 7, 1946 |

FOREIGN PATENTS

| Number | Country | Date |
| --- | --- | --- |
| 41,288 | Norway | Apr. 27, 1925 |
| 366,623 | France | (date unknown) |